(12) United States Patent
Missig et al.

(10) Patent No.: US 8,763,738 B2
(45) Date of Patent: Jul. 1, 2014

(54) FRONT END STRUCTURE FOR VEHICLE

(75) Inventors: Michael R. Missig, Powell, OH (US); Jason A. Widmer, Marysville, OH (US); Jeremy Paul Lucas, Delaware, OH (US); Kyle Stephen Mihok, Hilliard, OH (US); Ryan L. Kabbes, Delaware, OH (US); Michael W. Maurer, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 306 days.

(21) Appl. No.: 13/366,823

(22) Filed: Feb. 6, 2012

(65) Prior Publication Data

US 2013/0200655 A1 Aug. 8, 2013

(51) Int. Cl.
*B60K 11/08* (2006.01)

(52) U.S. Cl.
USPC .......................................... 180/68.1; 180/68.4

(58) Field of Classification Search
CPC ........ B60K 11/00; B60K 11/02; B60K 11/04; B60K 11/08; B60K 11/085
USPC ........................................ 180/68.1, 68.4, 68.6
See application file for complete search history.

(56) References Cited

U.S. PATENT DOCUMENTS

| | | | | | |
|---|---|---|---|---|---|
| 3,933,136 | A | * | 1/1976 | Burst | 123/41.58 |
| 4,566,407 | A | * | 1/1986 | Peter | 123/41.48 |
| 4,646,863 | A | | 3/1987 | Yamada | |
| 4,706,615 | A | * | 11/1987 | Scadding | 123/41.01 |
| 4,976,489 | A | * | 12/1990 | Lovelace | 296/180.1 |
| 5,193,608 | A | * | 3/1993 | Sekine et al. | 165/41 |
| 5,219,016 | A | * | 6/1993 | Bolton et al. | 165/41 |
| 5,551,505 | A | * | 9/1996 | Freeland | 165/41 |
| 6,676,179 | B2 | * | 1/2004 | Sato et al. | 293/115 |
| 7,410,018 | B2 | * | 8/2008 | Satou | 180/68.4 |
| 7,686,388 | B2 | | 3/2010 | Hasegawa et al. | |
| 8,287,036 | B2 | * | 10/2012 | Nakaura et al. | 296/203.02 |
| 2004/0124022 | A1 | | 7/2004 | Schmid et al. | |
| 2006/0254838 | A1 | | 11/2006 | Ino et al. | |

FOREIGN PATENT DOCUMENTS

JP 02109728 A * 4/1990 ............. B60K 11/04

* cited by examiner

*Primary Examiner* — Katy M Ebner
(74) *Attorney, Agent, or Firm* — Rankin, Hill & Clark LLP

(57) ABSTRACT

A front end structure for a vehicle includes a fascia member defining a forward end of an engine compartment of the vehicle and a radiator disposed in the engine compartment rearwardly spaced from the fascia member. At least one structural brace extends from a location at or near an underside of the vehicle to a location at or near an upper end of the engine compartment. A duct member is interposed between the fascia member and the radiator. The duct member at least partially blocks the radiator and defines a duct passage extending from an underside opening of the vehicle to the radiator. The duct member has at least one recess defined therein that receives the at least one structural brace.

22 Claims, 4 Drawing Sheets

FRONT END STRUCTURE FOR VEHICLE

BACKGROUND

The present disclosure generally relates to a front end structure for a vehicle, and particularly relates to a front end structure for a vehicle having a duct member defining a duct passage to a vehicle's radiator and having at least one recess defined therein that receives or accommodates at least one structural brace.

All vehicles are being pushed to increase aerodynamics and/or fuel economy. Presently, the open area through a vehicle's front fascia, which is often used for cooling, has a large negative impact on vehicle aerodynamics. Accordingly, there is a constant push to reduce the total amount of open area on vehicles and thereby increase aerodynamics and improve fuel economy. Unfortunately, this usually has a negative impact with respect to engine cooling.

In view of the foregoing, a bottom breather duct is sometimes employed, which can generally reduce the amount of open fascia area required for airflow to the radiator while still providing an airflow to the radiator. In particular, a bottom breather application enables air to be pulled in from the bottom of the vehicle, resulting in less drag. An example of a bottom breather application is the provision of an air inlet opening disposed on an underside of the vehicle and a duct passageway formed from the air inlet to the radiator so that airflow entering the inlet can flow to the radiator for cooling thereof.

One challenge in using a bottom breather duct is the mounting of the duct within the vehicle's engine compartment. Due to location concerns and/or other difficulties, the duct might not be able to be mounted to the bumper beam. Also, it can be very difficult to effectively mount the duct to the bulkhead extending laterally across the engine compartment.

SUMMARY

According to one aspect, a front end structure for a vehicle includes a fascia member defining a forward end of an engine compartment of the vehicle and a radiator disposed in the engine compartment rearwardly spaced from the fascia member. At least one structural brace extends from a location at or near an underside of the vehicle to a location at or near an upper end of the engine compartment. A duct member is interposed between the fascia member and the radiator. The duct member at least partially blocks the radiator and defines a duct passage extending from an underside opening of the vehicle to the radiator. The duct member has at least one recess defined therein that receives the at least one structural brace.

According to another aspect, a duct member assembly for a vehicle includes a structural brace and a duct member. The structural brace extends between a bulkhead extending laterally across an engine compartment of the vehicle and a lower structural member disposed adjacent an underside of the vehicle. The duct member is interposed longitudinally between a fascia member and a radiator of the vehicle. The duct member has a recess in which the structural brace is received such that an inner surface of the duct member and an exposed side of the structural brace together define a duct surface for directing air toward the radiator.

According to a further aspect, a duct member is provided that is mounted in an engine compartment of a vehicle between a front fascia member and a radiator. The duct member includes a wall portion including an angled upper section and a flared lower section. The wall portion is convex toward a forward end of the vehicle. The duct member further includes a pair of elongated recesses defined in the angled upper section for accommodating a pair of structural braces. The recesses have a shape complementary to the structural braces such that the structural braces do not protrude from the recesses in the angled upper section. The elongated recesses converge toward one another as the recesses extend from an upper end of the wall portion toward the flared lower portion.

DETAILED DESCRIPTION

Figure 1:
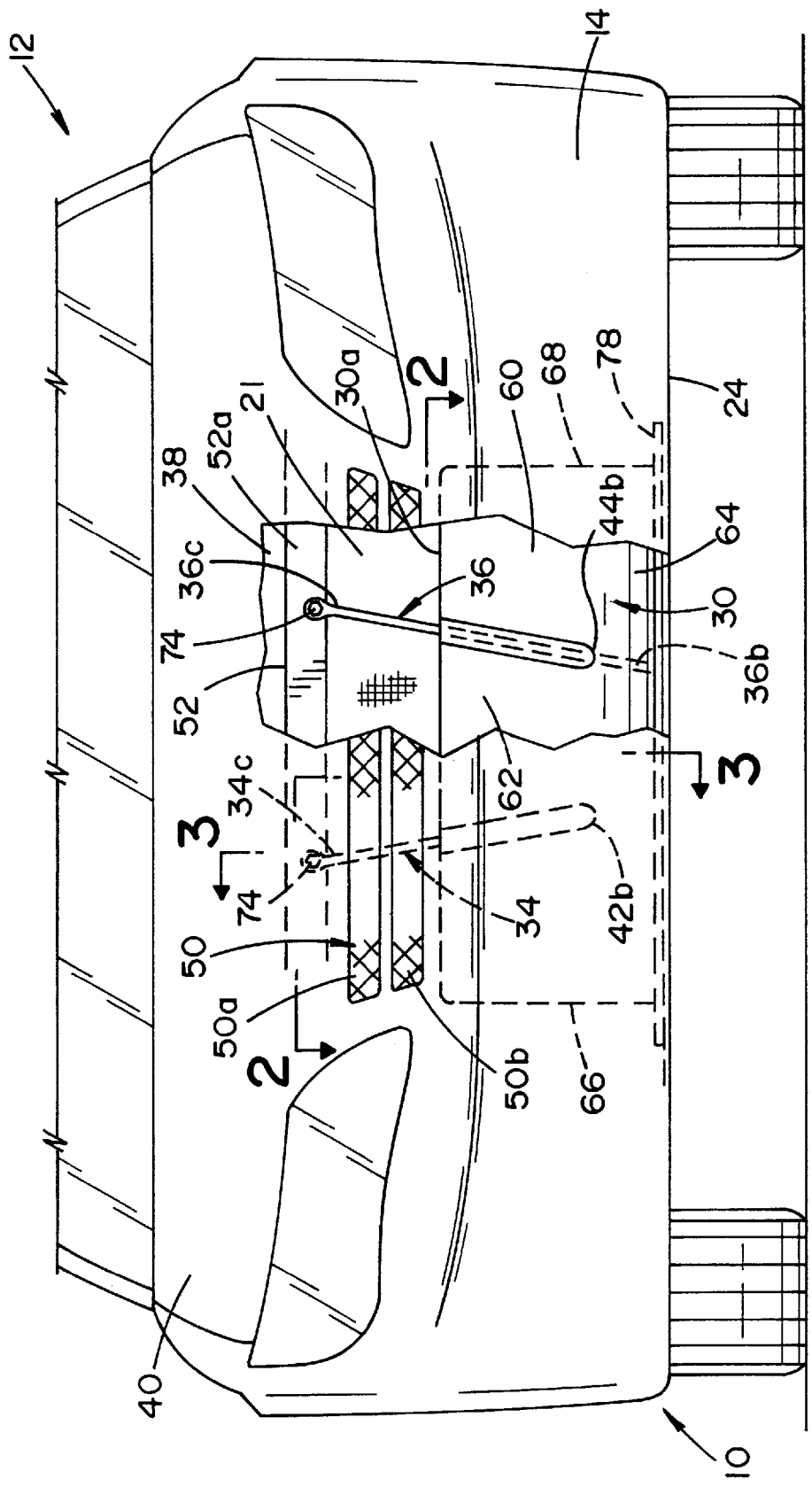
FIG. 1 is a front elevational view of a front end structure for a vehicle having a pair of structural braces and a duct member with recesses to accommodate the structural braces.
Figure 2:
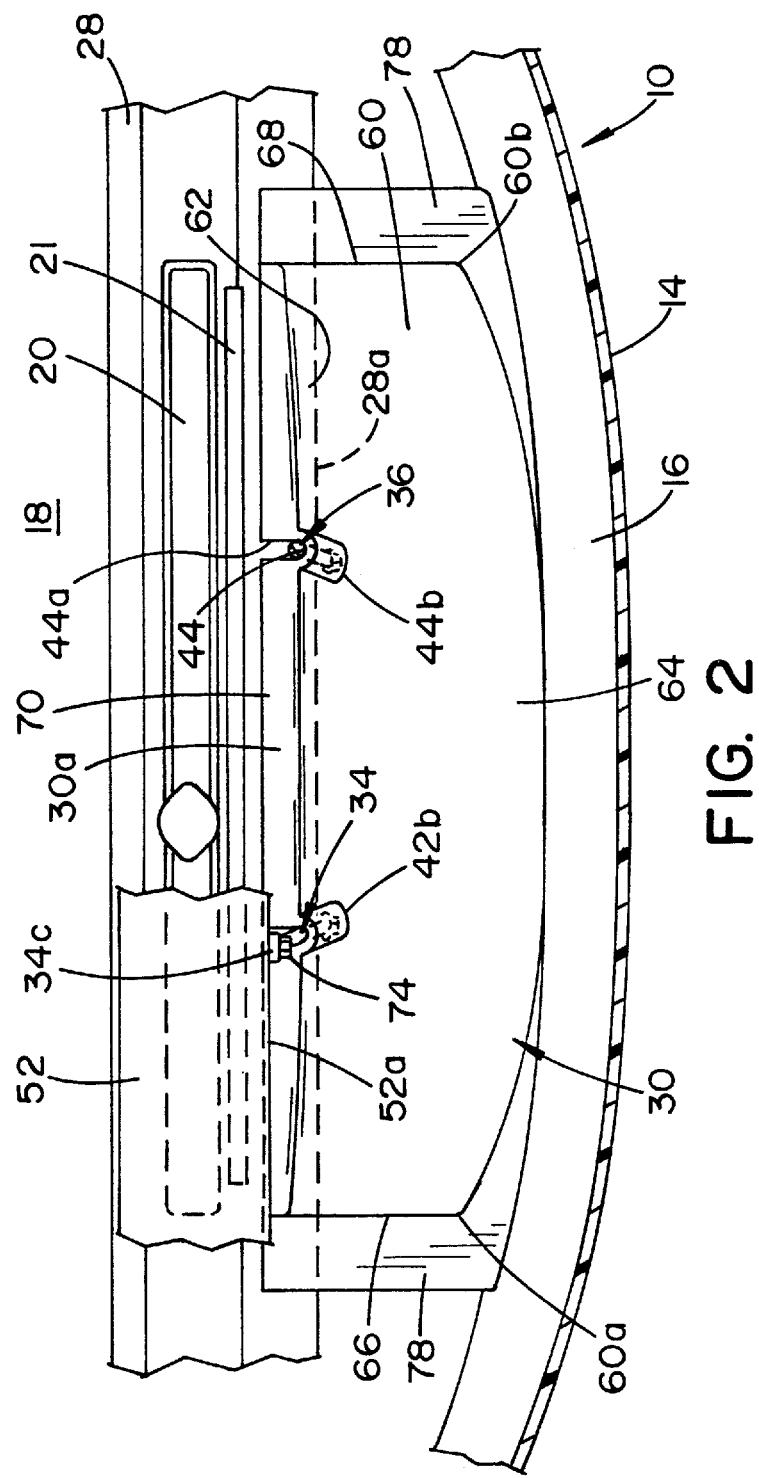
FIG. 2 is a cross-sectional view of the front end structure taken along the line 2-2 of FIG. 1.
Figure 3:
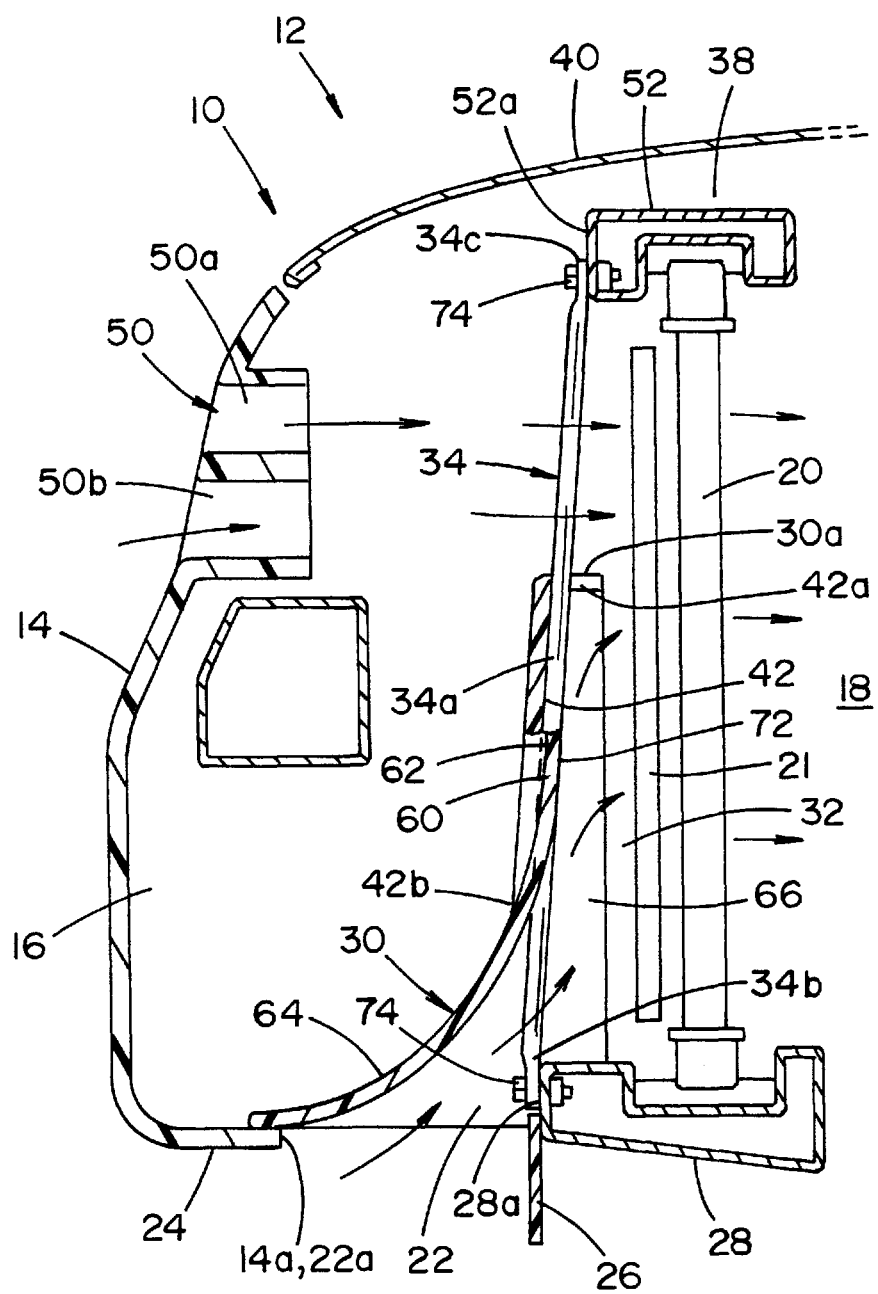
FIG. 3 is another cross-sectional view of the front end structure taken along the line 3-3 of FIG. 1.

Referring now to the drawings, wherein the showings are for purposes of illustrating one or more exemplary embodiments and not for purposes of limiting same, FIGS. 1-3 illustrate a vehicle front end or front end structure 10 on a vehicle 12. The illustrated front end structure 10 includes a fascia member 14 defining a forward end 16 of an engine compartment 18 of the vehicle 12. A radiator 20 is disposed in the engine compartment 18 rearwardly of the fascia member 14, and particularly rearwardly spaced from the fascia member 14. A condenser 21 can be disposed immediately forward of the radiator 20.

An underside air inlet opening 22 is defined in an underside 24 of the vehicle 12. In the illustrated embodiment, the underside air opening 22 is defined between a lower edge 14a of the fascia member 14 and another component (e.g., air dam member 26 attached to an underside bulkhead 28 in the illustrated embodiment), though this is not required. For example, in alternate embodiments, the underside air inlet opening could be defined in the fascia member 14, particularly in a portion extending and/or defining an underside of the vehicle, defined in another component spaced rearwardly of the fascia member 14, etc. As is known and understood by those skilled in the art, the underside bulkhead 28 can be included as part of a frame of the vehicle 12 and thus can extend laterally across the engine compartment 18 to lateral sides of the vehicle 12 at or adjacent the underside 22 of the vehicle 12 and/or can be connected to other structural frame members of the vehicle 12.

In the illustrated embodiment, a duct member 30 is interposed longitudinally between the fascia member 14 and the radiator 20. More particularly, the duct member 30 extends upward from a leading edge 22a of the opening 22, which is defined in the illustrated embodiment by the underside end 14a of the fascia member 14, and directs airflow entering the underside air inlet opening 22 toward the radiator 20. In the illustrated embodiment, the duct member 30 at least partially blocks the radiator 20 (i.e., blocks at least some airflow from entering through the fascia 14, or openings therein, and passing directly to the radiator 20) and defines a duct passageway 32 extending from the underside opening 22 of the vehicle to the radiator 20. In particular, and as shown, the duct member 30 can block airflow from entering a lower half of the radiator 20, or more particularly, a lower two-thirds of the radiator 20. Advantageously, this can allow the front fascia 14 to be closed along a corresponding vertical height thereof and, as will be described in more detail below, the size of the grill (e.g., grill 50 with grill openings 50a, 50b) can be minimized and provided only in alignment with an upper half or third of the radiator 20.

The duct member 30 can be one component of a duct member assembly that additionally includes at least one structural brace (e.g., braces 34, 36) extending from a location at or near the underside 24 of the vehicle 12 to a location at or near an upper end 38 of the engine compartment 18. The engine compartment 18, and particularly the upper end 38 thereof, can be bounded by the vehicle's hood 40. The duct member assembly can further include the duct member 30 having at least one recess (e.g., recesses 42, 44) defined therein that receives the at least one structural brace therein (e.g., recesses 42, 44 receive respectively braces 34, 36). The duct member 30 can supplement airflow to the radiator 20 and can also advantageously increase flow through the condenser 21.

A grill opening 50 is defined in the fascia member 14 for directing airflow to the radiator 20 over the duct member 30. In the illustrated embodiment, the grill opening 50 comprises an upper opening 50a and a lower opening 50b. As best shown in FIG. 3, airflow entering the grill openings 50a, 50b can pass directly to the radiator 20 over an upper end 30a of the duct member 30. This airflow path from the grill opening 50 defined in the fascia member 14 to the radiator 20 can be referred to as a grill airflow path. In the illustrated embodiment, the grill airflow path extends from the grill opening 50 to the radiator 20 and passes over the upper end 30a of the duct member 30. As shown, the duct member 30 extends upward across a substantial portion of the radiator 20 in the illustrated embodiment reducing a cross-sectional area through which the grill airflow path passes.

The front end structure 10 can additionally include a bulkhead 52 extending laterally across the engine compartment 18 at or adjacent the upper end 38 of the engine compartment 18. As is known and appreciated by those skilled in the art, the bulkhead 52 can be a part of the vehicle frame on the vehicle 12 and thus extends laterally to lateral sides of the vehicle 12. As will be described in more detail below, an upper end of the at least one structural brace (e.g., upper ends 34c, 36c of structural braces 34, 36) can be mounted to the bulkhead 52 and a lower end of the at least one structural brace (e.g., lower ends 34b, 36b of structural braces 34, 36) can be mounted to the lower bulkhead 28. In the illustrated embodiment, a leading surface 28a of the lower bulkhead 28 is forwardly disposed relative to a leading surface 52a of the bulkhead 52 such that the at least one structural brace (e.g., braces 34, 36) extends downward from the bulkhead 52 to the lower bulkhead 28 at a slight angle relative to a vertical plane, such as at about 5 degrees.

Figure 4:
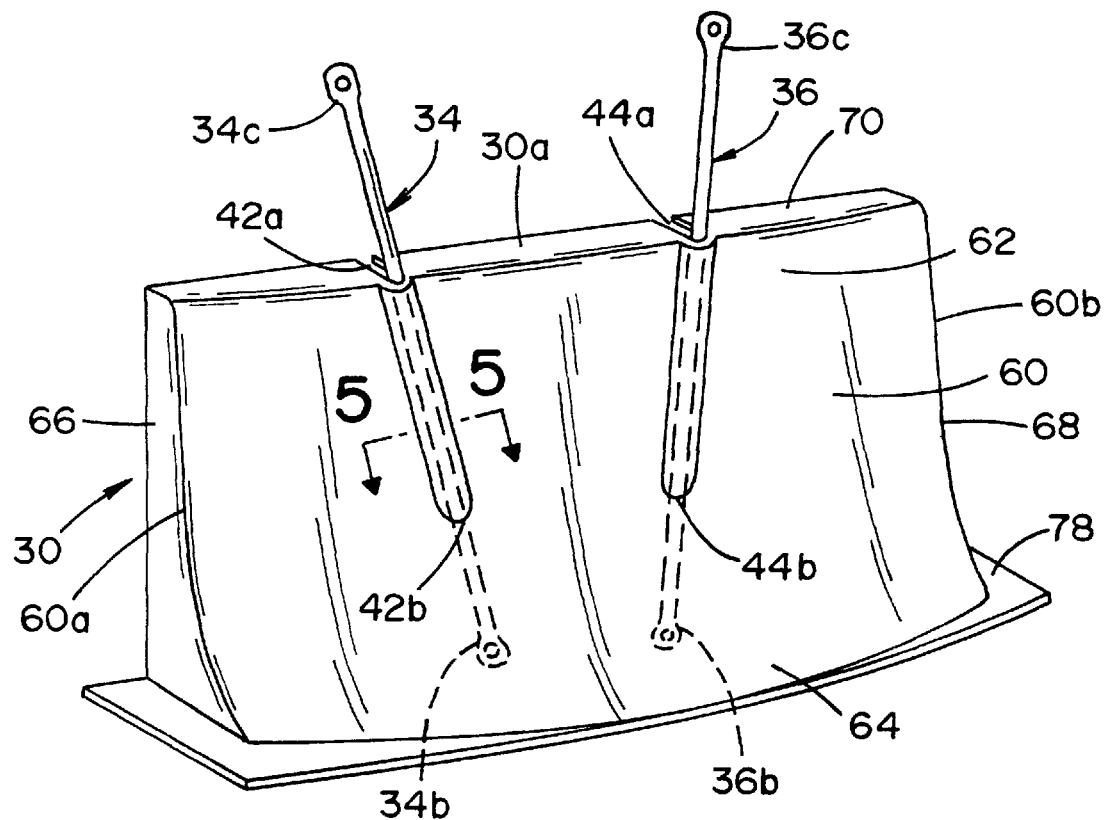
FIG. 4 is a perspective view showing the structural braces and the duct member in isolation.

With particular reference to FIG. 4, in the illustrated embodiment, the duct member 30 includes a wall portion 60 including an angled upper portion or section 62 and a flared lower portion or section 64. As shown, the wall portion 60 can be generally convex toward the forward end 16 of the vehicle 12. This curvature of the wall portion 60 can match, in whole or part, a curvature of the fascia member 14, though this is not required. The angled upper portion 62 can comprise about an upper two-thirds or one-half of the vertical height of the duct member 30 and/or the flared lower section 64 can comprise about a lower one-third or one-half of the vertical height of the duct member 30. The duct member 30 can additionally include lateral sides 66, 68 extending from lateral edges 60a, 60b of the angled upper section 62 and the flared lower section 64. The lateral sides 66, 68 can extend rearwardly from the lateral edges 60a, 60b of the angled upper section 62 and the flared lower section 64. The upper end 30a can be formed by another side 70, also extending rearwardly from the wall portion 60. A lip or reinforcing portion 78 can be disposed along a lower edged o the flared lower portion 64.

Figure 5:
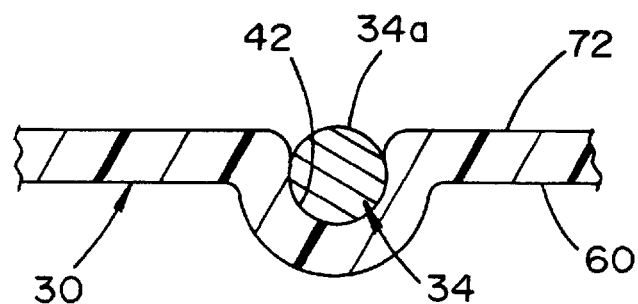
FIG. 5 is a cross-sectional view taken along the line 5-5 of FIG. 4 showing one of the structural braces accommodated in a recess of the duct member.

The at least one structural member (e.g., braces 34, 36) can be nestably received in the at least one recess (e.g., 42, 44) of the duct member 30. In particular, the at least one structural member can be complementarily accommodated in the at least one recess such that at least a portion of the duct member 30 defining the recess has a shape that complementarily matches a cross-section of the at least one structural brace. More particularly, in the illustrated embodiment, the at least one structural brace can be a structural brace having a generally circular cross-section and the at least one recess can be a recess having a curved surface matching an outside surface of the structural brace. Such an arrangement is illustrated in FIG. 5 wherein structural brace 34 is accommodated in recess 42 defined in the duct member 30. In one embodiment, the structural brace 34 has a relatively small cross-section relative to an axial length of the structural brace and can be referred to as a pencil brace, though this is not required and the structural brace 34 can have any suitable cross-sectional shape.

More specifically, in the illustrated embodiment, the at least one structural brace can include first structural brace 34 and second structural brace 36. Similarly, the at least one recess can include first recess 42 accommodating the first structural brace 34 and second recess 44 accommodating the second structural brace 36. The structural braces 34, 36 can extend between the bulkhead 52 and the lower bulkhead 28. The structural braces 34, 36 can be respectively received in the recesses 42, 44 such that an inner surface 72 of the duct member 30 and an exposed side 34a, 36a of each structural brace 34, 36 together define a duct surface for directing airflow toward the radiator 20. With particular reference to FIG. 5, each of the recesses 42, 44 can have a depth dimension that exceeds a diameter of the structural braces 34, 36 such that the structural braces 34, 36 are each fully accommodated in their respective recesses 42, 44 in the angled upper portion 62 and do not protrude from the recesses 42, 44 at least along an upper half of the duct member 30. In addition to the pair of structural braces 34, 36 and the lower bulkhead 28, or at least leading surface 28a, being forwardly disposed relative to the bulkhead 52, lower ends 34b, 36b of the structural braces 34, 36 can be spaced together more closely than upper ends 34c, 36c of the structural braces 34, 36.

As shown in the illustrated embodiment, the structural braces 34, 36 extend along an entire vertical height of the duct member 30. Additionally, the recesses 42, 44 are each elongated with first ends 42a, 44a disposed at the upper end 30a of the duct member (i.e., defined in upper side 70) and lower ends 42b, 44b disposed adjacent the lower bulkhead 28. The lower ends 42b, 44b of the recesses 42, 44 can be disposed near the intersection between the angled upper section 62 and the flared lower section 64. Accordingly, the elongated recesses 42, 44 are defined in the angled upper section 62 for accommodating the structural braces 34, 36. The recesses 42, 44 each have a shape complementary to the structural braces 34, 36 such that the structural braces do not protrude from the recesses 42, 44 in the angled upper section 62 as best shown with respect to structural brace 34 in FIG. 5. Like the structural braces 34, 36, the elongated recesses 42, 44 converge toward one another as the recesses 42, 44 extend from the upper end 30a of the wall portion 60 of the duct member 30 toward the flared lower portion 64. In the illustrated embodiment, the recesses 42, 44 are defined only in the angled upper portion above the flared lower portion 64, though this is not required.

Upper ends 34c, 36c of the structural braces 34, 36 can be mounted directly to the bulkhead 52. In particular, as shown in the illustrated embodiment, the upper ends 34c, 36c can be have a mounting aperture defined therethrough that receives a suitable fastener (e.g., illustrated bolts 74) that can secure the structural braces 34, 36 to the bulkhead 52. Likewise, lower ends 34b, 36b can be mounted directly to the bulkhead 28 and, in the illustrated embodiment, can have mounting apertures defined therethrough for receipt of suitable fasteners (e.g., illustrated bolts) that can secure the lower ends 34b, 36b to the lower bulkhead 28. The duct member 30 can be mounted to the structural braces 34, 36. In one embodiment, the duct member 30 is removable mounted to the braces 34, 36 via a snap-fit, which allows for servicing and/or possible replacement of the radiator 20 and/or condenser 21.

Advantageously, the provision of recesses 42, 44 defined in the duct member 30 to accommodate the structural braces 34, 36 removes the structural braces 34, 36 from restricting airflow inside the duct 30, which would otherwise negatively affect cooling performance of the duct member 30. In particular, the duct member 30 with its recesses 42, 44 is designed to wrap around the structural braces 34, 36 allowing the structural braces 34, 36 to act as the inner surface of the duct. The advantage of this arrangement is that it allows for mounting of the duct member 30 to the structural braces 34, 36 without a large sacrifice with respect to cooling performance. The structural braces 34, 36 improve body rigidity, particularly as relates to steering and NVH performance.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A front end structure for a vehicle, comprising:
a fascia member defining a forward end of an engine compartment of the vehicle;
a radiator disposed in the engine compartment rearwardly spaced from the fascia member;
at least one structural brace extending from a location at or near an underside of the vehicle to a location at or near an upper end of the engine compartment; and
a duct member interposed between the fascia member and the radiator, the duct member at least partially blocking the radiator and defining a duct passage extending from an underside opening of the vehicle to the radiator, the duct member has at least one recess defined therein that receives the at least one structural brace, wherein the at least one structural brace includes a first structural brace and a second structural brace, and the at least one recess includes a first recess accommodating the first structural brace and a second recess accommodating the second structural brace, upper ends of the first and second structural braces spaced apart laterally a greater distance than lower ends of the first and second structural braces.

2. The front end structure of claim 1 further including:
a bulkhead extending laterally across the engine compartment at or adjacent the upper end of the engine compartment, an upper end of the at least one structural brace mounted to the bulkhead.

3. The front end structure of claim 2 further including:
a lower structural member extending laterally across the engine compartment at or adjacent the underside of the vehicle, a lower end of the at least one structural brace mounted to the lower structural member.

4. The front end structure of claim 3 wherein the lower structural member is forwardly disposed relative to the bulkhead such that the at least one structural brace extends downward from the bulkhead to the lower structural member at a slight angle relative to a vertical plane.

5. The front end structure of claim 1 wherein the at least one structural member is nestably received in the at least one recess.

6. The front end structure of claim 1 wherein the at least one structural member is complementarily accommodated in the at least one recess such that at least a portion of the duct member defining the recess has a shape that complementarily matches a cross section of the at least one structural brace.

7. The front end structure of claim 6 wherein the at least one structural brace is a structural brace having a generally circular cross section and the at least one recess is a recess having curved surface matching an outside surface of the structural brace.

8. The front end structure of claim 1 wherein the at least one structural brace extends along an entire vertical height of the duct member.

9. The front end structure of claim 1 wherein the duct member includes a flared lower portion and an angled upper portion, the at least one recess defined only in the angled upper portion above the flared lower portion.

10. The front end structure of claim 9 wherein the at least one recess has a depth dimension that exceeds a diameter of the at least one structural brace such that the at least one structural brace is fully accommodated in the at least one recess in the angled upper portion and does not protrude from the at least one recess at least along an upper half of the duct member.

11. The front end structure of claim 1 wherein the duct member is mounted to the at least one structural brace via a snap-fit connection.

12. A duct member assembly for a vehicle, comprising:
A first structural brace extending between a bulkhead extending laterally across an engine compartment of the vehicle and a lower structural member disposed adjacent an underside of the vehicle;
a duct member interposed longitudinally between a fascia member and a radiator of the vehicle:
a first recess defined in the duct member in which the first structural brace is received such than an inner surface of the duct member and an exposed side of the first structural brace together define a duct surface for directing air toward the radiator;
a second structural brace extending between the bulkhead and the lower structural member; and
a second recess defined in the duct member in which the second structural brace is received such that an exposed side of the second structural brace additionally defines the duct surface, and lower ends of the first and second structural braces are spaced together more closely than upper ends of the first and second structural braces.

13. The duct member assembly of claim 12 wherein the lower structural member is forwardly disposed relative to the bulkhead.

14. The duct member assembly of claim 12 wherein each recess is elongated with a first end disposed at an upper end of the duct member and a lower end disposed adjacent the lower structural member.

15. The duct member assembly of claim 14 wherein the duct member includes an angled upper section and a flared lower section, the lower end of each recess disposed near an intersection between the angled upper section and the flared lower section.

16. The duct member assembly of claim 15 wherein the angled upper section comprises about an upper ⅔ of a vertical height of the duct member and the flared lower section comprises about a lower ⅓ of the vertical height of the duct member.

17. The duct member assembly of claim 15 wherein the duct member includes lateral sides extending from lateral edges of the angled upper section and the flared lower section, the lateral sides extending rearwardly from the laterals sides of the angled upper section and the flared lower section.

18. A duct member mounted in an engine compartment of a vehicle between a first fascia member and a radiator, the duct member comprising:
 a wall portion including an angled upper section and a flared lower section, the wall portion convex toward a forward end of the vehicle; and
 a pair of elongated recesses defined in the angled upper section for accommodating a pair of structural braces, the recesses having a shape complementary to the structural braces such that the structural braces do not protrude from the recesses in the angled upper section, the elongated recesses converging toward one another as the recesses extend from an upper end of the wall portion toward the flared lower portion.

19. The front end structure of claim 18 wherein the pair of structural braces are nestably received in the pair of elongated recesses.

20. The front end structure of claim 18 wherein each of the pair of recesses has a depth dimension that exceeds a diameter of each of the pair of structural braces such that the pair of structural braces is fully accommodated in the pair of elongated recesses.

21. The front end structure of claim 18 wherein the duct member is mounted to the pair of structural braces via snap-fit connections.

22. A front end structure for a vehicle, comprising:
 a fascia member defining a forward end of an engine compartment of the vehicle;
 a radiator disposed in the engine compartment rearwardly spaced from the fascia member;
 at least one structural brace extending from a location at or near an underside of the vehicle to a location at or near an upper end of the engine compartment; and
 a duct member interposed between the fascia member and the radiator, the duct member at least partially blocking the radiator and defining a duct passage extending from an underside opening of the vehicle to the radiator, the duct member has at least one recess defined therein that receives the at least one structural brace;
 a bulkhead extending laterally across the engine compartment at or adjacent the upper end of the engine compartment, an upper end of the at least one structural brace mounted to the bulkhead; and
 a lower structural member extending laterally across the engine compartment at or adjacent the underside of the vehicle, a lower end of the at least one structural brace mounted to the lower structural member, wherein the lower structural member is forwardly disposed relative to the bulkhead such that the at least one structural brace extends downward from the bulkhead to the lower structural member at a slight angle relative to a vertical plane.

* * * * *